US012619884B2

(12) United States Patent
Wu et al.

(10) Patent No.: US 12,619,884 B2
(45) Date of Patent: May 5, 2026

(54) ARTIFICIAL INTELLIGENCE OPERATIONS ADAPTIVE MULTI-GRANULARITY EVENT GROUPING

(71) Applicant: INTERNATIONAL BUSINESS MACHINES CORPORATION, Armonk, NY (US)

(72) Inventors: Zhao Qi Wu, Shanghai (CN); Zhi Wang, Shanghai (CN); Qian Ke Fang, Zhengjiang (CN); Li Na Yuan, Beijing (CN); Min Xiang, Beijing (CN); Li Long Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1118 days.

(21) Appl. No.: 17/572,155

(22) Filed: Jan. 10, 2022

(65) Prior Publication Data

US 2023/0222358 A1 Jul. 13, 2023

(51) Int. Cl.
*G06N 5/022* (2023.01)
*G06N 20/00* (2019.01)

(52) U.S. Cl.
CPC ............. *G06N 5/022* (2013.01); *G06N 20/00* (2019.01)

(58) Field of Classification Search
CPC .......... G06N 5/022; G06N 20/00; G06N 5/00; G06N 5/02; G06N 5/025; G06N 20/10;
(Continued)

(56) References Cited

U.S. PATENT DOCUMENTS 7,774,790 B1 * 8/2010 Jirman ................ G06F 11/3476
719/318
8,645,389 B2 2/2014 Oliver et al.
(Continued)

FOREIGN PATENT DOCUMENTS

| EP | 3399432 | 11/2018 |
| JP | 2020064463 | 2/2023 |

OTHER PUBLICATIONS

W. Meng et al., "LogParse: Making Log Parsing Adaptive through Word Classification," 2020 29th International Conference on Computer Communications and Networks (ICCCN), Honolulu, HI, USA, 2020, pp. 1-9 (Year: 2020).*

(Continued)

*Primary Examiner* — Shane D Woolwine
(74) *Attorney, Agent, or Firm* — Seed Intellectual Property Law Group LLP

(57) ABSTRACT

System and methods for adaptive multi-granularity event groupings are provided. In embodiments, a method includes: determining to group IT operations data at a first level of granularity for similar events or at a second level of granularity for related events based on user input of a data grouping event; parsing, by an event parser, the IT operations data into one or more groups of similar events based on text information and parser rules in response to determining to group the IT operations data at the first level of granularity; obtaining user feedback indicating the one or more groups of similar events require modification; determining one or more keywords of the IT operations data using an artificial intelligence model in response to the user feedback; and updating the parser rules for the event parser based on the one or more keywords, thereby generating updated parser rules.

20 Claims, 10 Drawing Sheets

(58) Field of Classification Search
  CPC ....... G06N 20/20; G06F 40/20; G06F 40/205;
                  G06F 16/2477; G06F 16/28; G06F
                                                          16/287
  See application file for complete search history.

(56) References Cited

U.S. PATENT DOCUMENTS

| | | | | |
|---|---|---|---|---|
| 10,805,144 | B1 | 10/2020 | Gangadharan et al. | |
| 11,675,816 | B1 * | 6/2023 | Chandrasekharan | ........................ G06F 11/3082 707/737 |
| 11,687,438 | B1 * | 6/2023 | Torbett | ................ G06F 11/3428 702/186 |
| 11,762,714 | B2 * | 9/2023 | Bonnell | ................. G06N 20/00 707/740 |
| 2014/0129536 | A1 | 5/2014 | Anand et al. | |
| 2016/0371132 | A1 * | 12/2016 | Prabhakara | ......... G06F 11/0793 |
| 2017/0142482 | A1 * | 5/2017 | Zhou | ................ H04N 21/25883 |
| 2017/0277782 | A1 | 9/2017 | Vogel et al. | |
| 2017/0286525 | A1 | 10/2017 | Li et al. | |
| 2017/0300473 | A1 | 10/2017 | Bhattacharya | |
| 2019/0052514 | A1 | 2/2019 | Tee | |
| 2019/0132191 | A1 | 5/2019 | Mann et al. | |
| 2020/0320432 | A1 | 10/2020 | Chan et al. | |
| 2022/0207429 | A1 * | 6/2022 | Haribhakti | ............. G06N 20/10 |
| 2022/0277652 | A1 * | 9/2022 | Li | ....................... G06F 9/30038 |

OTHER PUBLICATIONS

Min Du, Feifei Li, Guineng Zheng, and Vivek Srikumar. 2017. DeepLog: Anomaly Detection and Diagnosis from System Logs through Deep Learning. In Proceedings of the 2017 ACM SIGSAC Conference on Computer and Communications Security (Year: 2017).*

Mell et al., "The NIST Definition of Cloud Computing", NIST, Special Publication 800-145, Sep. 2011, 7 pages.

Weibin Meng et al., "LogParse: Making Log Parsing Adaptive through Word Classification", 2020 29th International Conference on Computer Communications and Networks (ICCCN), 2020, 9 pages.

Pinjia He et al., "Drain: An Online Log Parsing Approach with Fixed Depth Tree", 2017 IEEE International Conference on Web Services (ICWS), 2017, pp. 33-40, doi: 10.1109/ICWS.2017.13., 8 pages.

International Search Report and Written Opinion for PCT/CN2023/070912 dated Mar. 22, 2023; 8 Pages.

* cited by examiner

400

Client Device
406

IT Operations
Module
420

Communication
Module
421

Network
402

Server
404

Data Collection
Module
410

Data Storage
Module
411

Event Parser
Module
412

User Interface
Module
413

Adaptive Model
Module
414

Embedding
Module
415

Classification
Module
416

Cluster Module
417

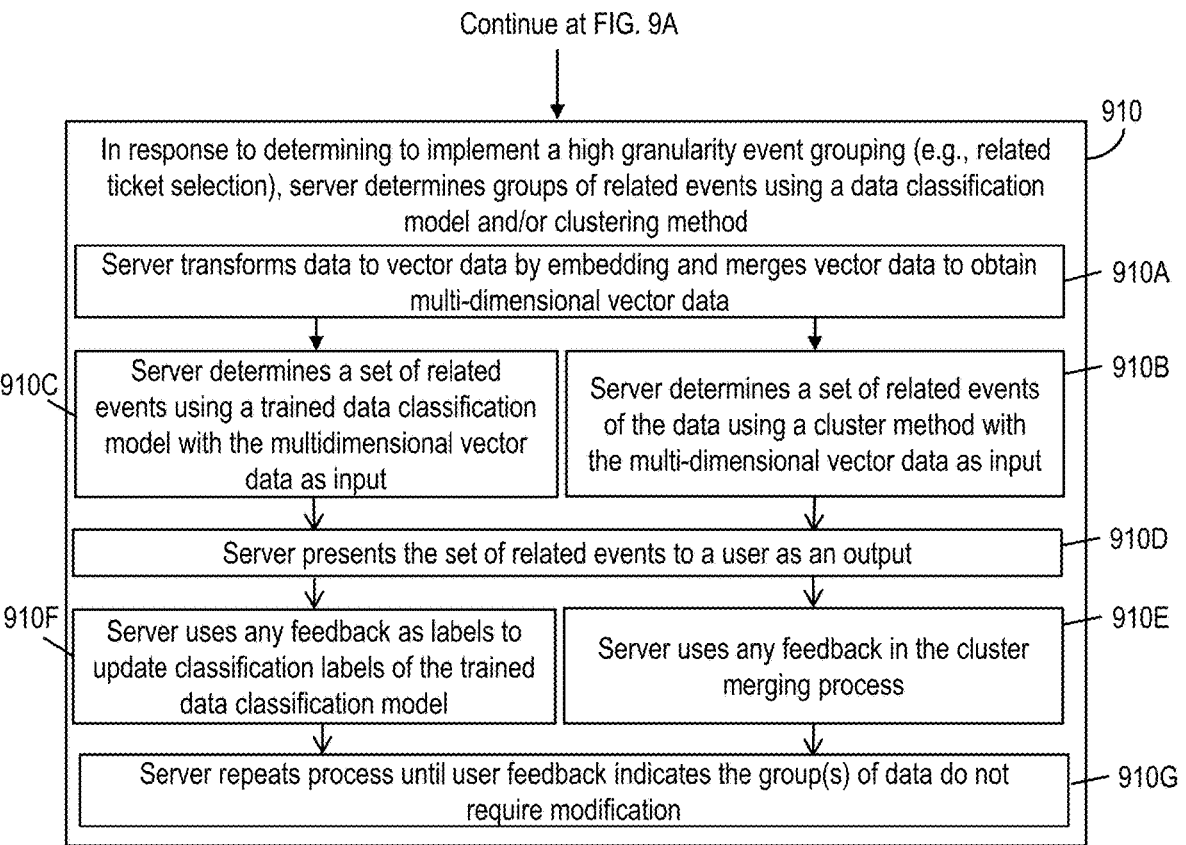

910

In response to determining to implement a high granularity event grouping (e.g., related ticket selection), server determines groups of related events using a data classification model and/or clustering method Server transforms data to vector data by embedding and merges vector data to obtain multi-dimensional vector data — 910A 910C — Server determines a set of related events using a trained data classification model with the multidimensional vector data as input Server determines a set of related events of the data using a cluster method with the multi-dimensional vector data as input — 910B Server presents the set of related events to a user as an output — 910D 910F — Server uses any feedback as labels to update classification labels of the trained data classification model Server uses any feedback in the cluster merging process — 910E Server repeats process until user feedback indicates the group(s) of data do not require modification — 910G

FIG. 9B

ARTIFICIAL INTELLIGENCE OPERATIONS ADAPTIVE MULTI-GRANULARITY EVENT GROUPING

BACKGROUND

Aspects of the present invention relate generally to Artificial Intelligence Operations (AIOps) and, more particularly, to systems and methods for adaptive multi-granularity event grouping of information technology (IT) operations data.

With the proliferation of DevOps (development and operations) software and the rapid adaption of advanced technologies like cloud computing, information technology (IT) data volumes have exploded and become a challenge in recent years. To address this pressing problem, artificial intelligence for IT operations (AIOps) tools have been adopted to help IT teams manage data volumes. The term AIOps generally refers to machine learning analytics technology that enhances IT operations analytics. One AIOps task of note is event grouping.

In general, the term event grouping refers to a process of searching for similar or related individual data records, such as logs and tickets, and grouping the similar or related data records together. Event grouping has played an important role in recent years with the increasing complexity and scalability of IT services. With the help of event grouping, AIOps systems can analyze root causes, detect anomalies, and discovery underlying patterns in data records (e.g., big data). However, although the function of event grouping has been employed in many tools and products, existing event grouping methods have many shortcomings. As an example, it is difficult for existing event grouping solutions to fully adapt to requirements of different customers, since the solutions are developed from basic log parsers or cluster methods, and only allow limited customization. Therefore, such event grouping solutions require engineers to manually go through massive data records, which is time consuming and makes the event grouping performance extremely dependent on the expertise of engineers.

SUMMARY

In a first aspect of the invention, there is a computer-implemented method including: determining, by a computing device, to group IT operations data at a first level of granularity for similar events or at a second level of granularity for related events based on user input of a data grouping event; parsing, by an event parser of the computing device, the IT operations data into one or more groups of similar events based on text information and parser rules in response to determining to group the IT operations data at the first level of granularity; obtaining, by the computing device, user feedback indicating the one or more groups of similar events require modification; determining, by the computing device, one or more keywords of the IT operations data using an artificial intelligence model in response to the user feedback; and updating, by the computing device, the parser rules for the event parser based on the one or more keywords, thereby generating updated parser rules.

In another aspect of the invention, there is a computer program product including one or more computer readable storage media having program instructions collectively stored on the one or more computer readable storage media. The program instructions are executable to: determine whether to group IT operations data at a first granularity for similar events or a second granularity for related events based on user input of a data grouping event; in response to determining to group the IT operations data at the first level of granularity based on the user input, parse the IT operations data into a first set of event groupings using an event parser based on text information and parser rules; in response to determining to group the IT operations data at the second level of granularity based on the user input, transform the IT operations data to multi-dimensional vector data; and in response to transforming the IT operations data to multi-dimensional vector data, determine a second set of event groupings using a clustering method with the multi-dimensional vector data as input.

In another aspect of the invention, there is system including a processor, a computer readable memory, one or more computer readable storage media, and program instructions collectively stored on the one or more computer readable storage media. The program instructions are executable to: determine whether to group IT operations data at a first level of granularity for similar events or a second level of granularity for related events based on user input of a data grouping event; in response to determining to group the IT operations data at the first level of granularity based on the user input, parse the IT operations data into a first set of event groupings using an event parser based on text information and parser rules; in response to determining to group the IT operations data at the second level of granularity based on the user input, transform the IT operations data to multi-dimensional vector data; and in response to transforming the IT operations data to multi-dimensional vector data, determine a second set of event groupings using a trained data classification model with the multi-dimensional vector data as input.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 9A-9B show a flowchart of an exemplary method in accordance with aspects of the invention.

DETAILED DESCRIPTION

Figure 1:
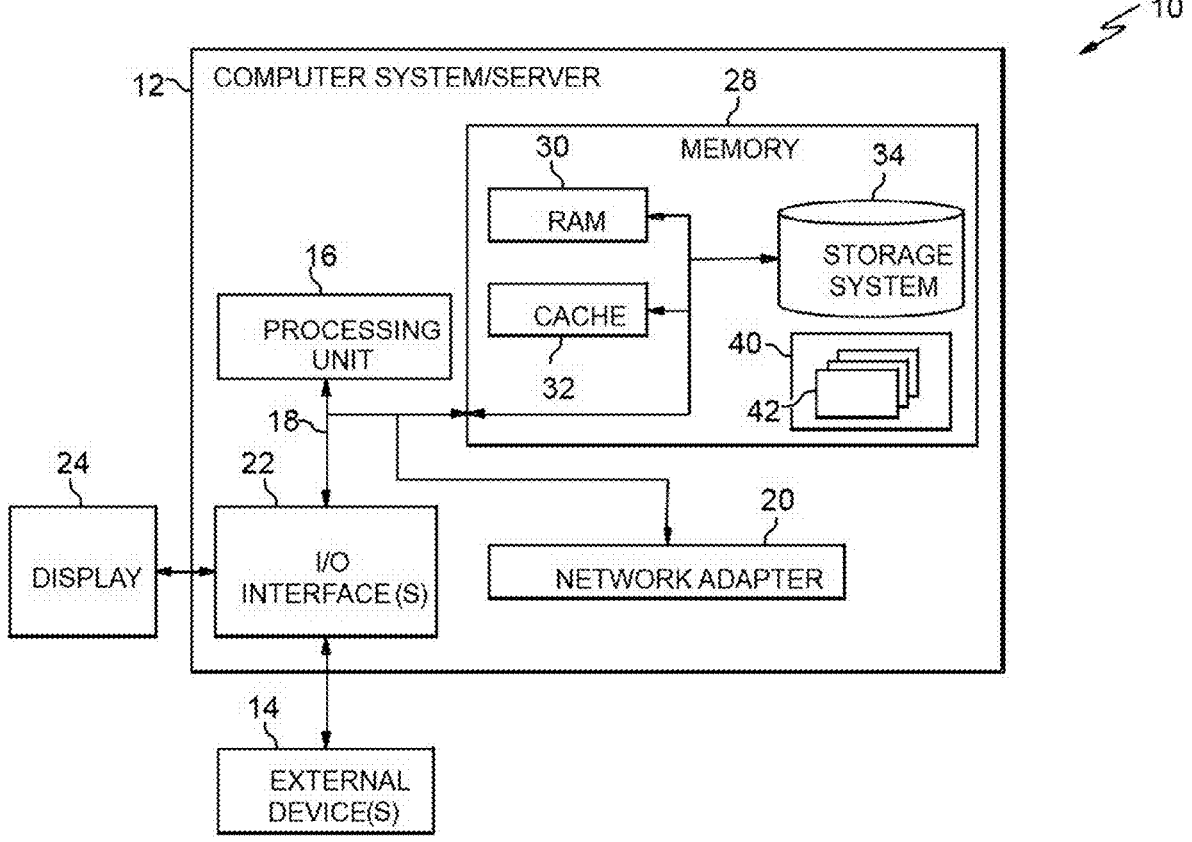
FIG. 1 depicts a cloud computing node according to an embodiment of the present invention.

Aspects of the present invention relate generally to Artificial Intelligence Operations (AIOps) and, more particularly, to systems and methods for adaptive multi-granularity event grouping of information technology (IT) operations data. In embodiments, a process is provided to perform event grouping tasks in the field of AIOps, wherein various AI approaches are combined to meet different operation requirements. Implementations of the invention apply adaptive learning to an automated event grouping system to enable new customization methods. The term adaptive learning (adaptive teaching) generally refers to a computer learning method that utilizes computer algorithms and artificial intelligence to provide learning functions to address specific needs of a user or system.

Compared with event grouping approaches that still require significant manual intervention, embodiments of the invention enable a customizable event grouping process configured to automatically adapt to different requirements with multi-granularity groupings. Accordingly, advantages of embodiments of the invention benefit the whole DevOps process. For example, embodiments of the invention constitute an improvement in the technical field of AIOps by providing a system and method to automatically customize multi-granular event grouping methods based on adaptive learning through user feedback. Implementations of the invention address the technical problem of generating desired analytic outputs for large amounts of incoming IT operations data (e.g., big data), such as IT tickets and log records reflecting IT operation events (e.g., errors and system failures). In aspects, special purpose computing tools such as trained classification models and modified event parsers are utilized to provide customized analytics outputs through adaptive learning.

In embodiments, a method is provided to organize data records into multi-granular groups according to adaptive learning. In implementations, a customizable event grouping system is provided that is configured to adapt to different customer requirements by providing a first approach for finding similar data records, and a second approach for finding related data records. In aspects of the invention, a customizable parser is utilized to extract templates from text. In implementations, an embedding method is utilized to encode data records through multi-dimensional data, and a cluster method is utilized to learn/obtain feedback information in the cluster merging process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
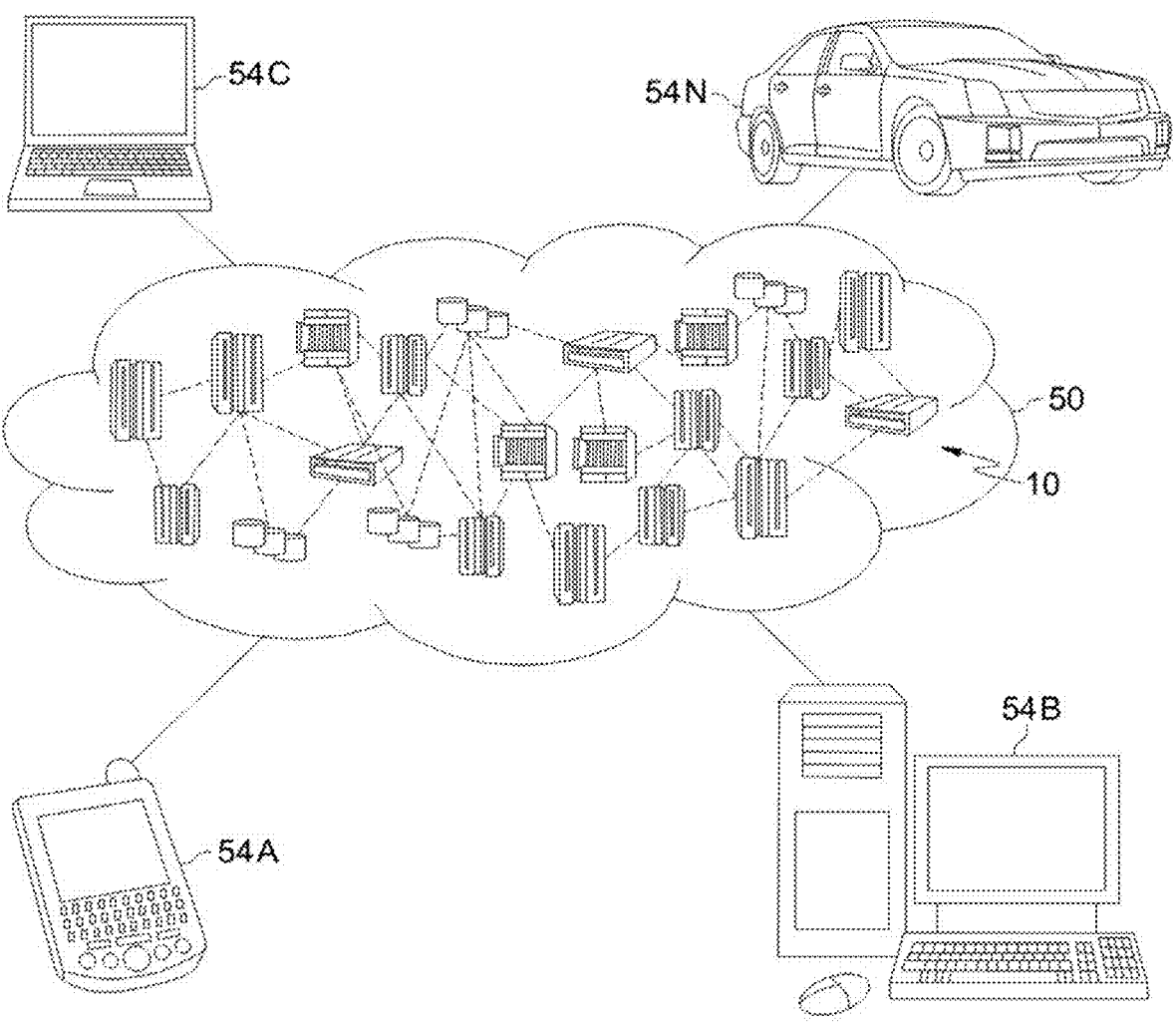
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
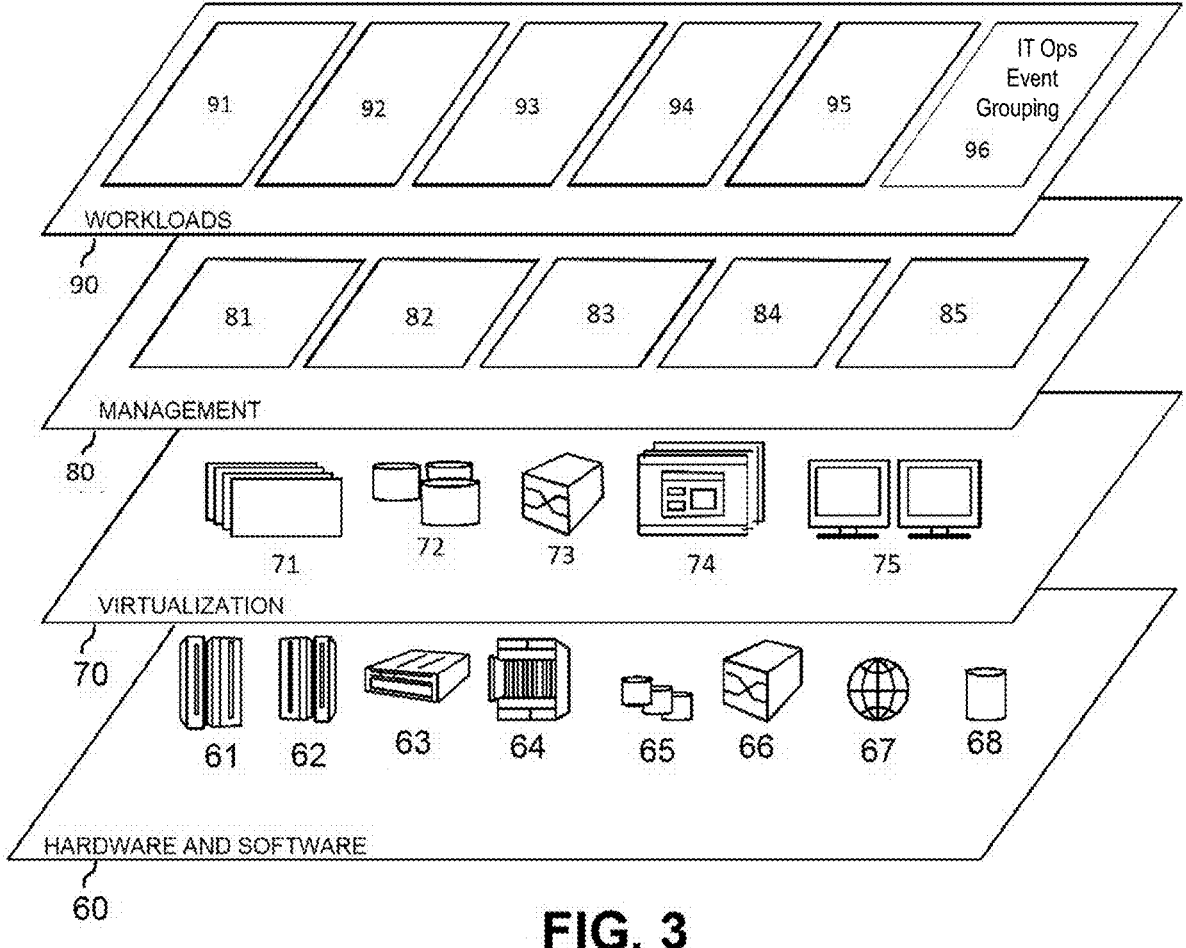
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IT Ops event grouping 96.

Implementations of the invention may include a computer system/server 12 of FIG. 1 in which one or more of the program modules 42 are configured to perform (or cause the computer system/server 12 to perform) one of more functions of the IT Ops event grouping 96 of FIG. 3. For example, the one or more of the program modules 42 may be configured to: determine whether to group IT operations data at a first granularity for similar events or a second granularity for related events based on user input of a data grouping event; in response to determining to group the IT operations data at the first level of granularity based on the user input, parse IT operations data into a first set of event groupings using an event parser based on text information and parser rules; in response to determining to group the IT operations data at the second level of granularity based on the user input, transform the IT operations data to multi-dimensional vector data; in response to transforming the IT operations data to multi-dimensional vector data, determine a second set of event groupings using a trained data classification model with the multi-dimensional vector data as input and/or determine a third set of event groupings using a clustering method with the multi-dimensional vector data as input.

Figure 4:
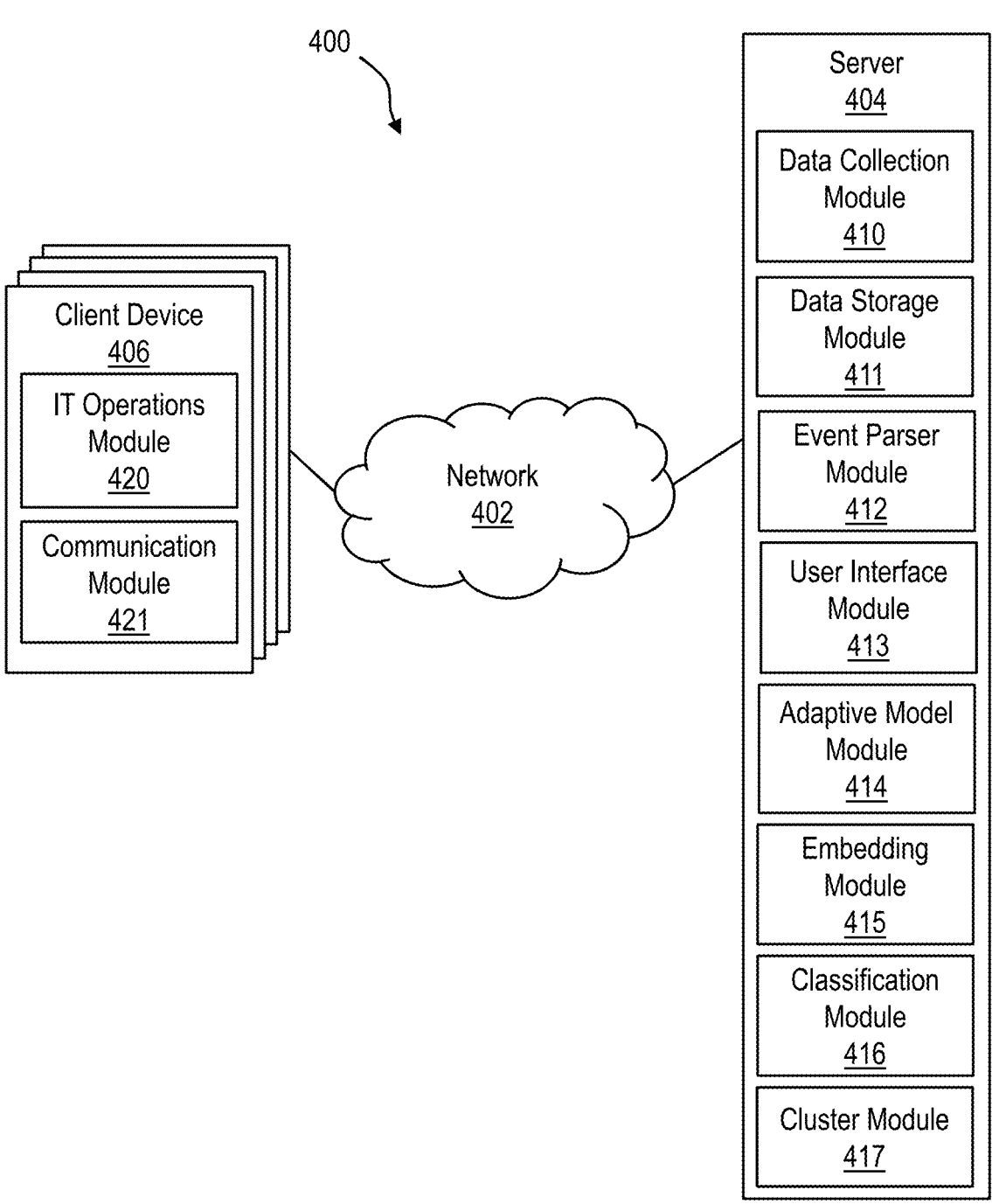
FIG. 4 shows a block diagram of an exemplary environment in accordance with aspects of the invention.

FIG. 4 shows a block diagram of an exemplary AIOps environment 400 in accordance with aspects of the invention. In embodiments, the AIOps environment 400 includes a network 402 enabling communication between a server 404 and one or more client device 406. The server 404 and the one or more client devices 406 may each comprise the computer system/server 12 of FIG. 1, or elements thereof. In implementations, the server 404 comprises a computing node 10 in the cloud computing environment 50 of FIG. 2, and the one or more client devices 406 comprise local computing devices used by cloud consumers, such as, for example, a desktop computer 54B.

In embodiments, the server 404 comprises one or more modules, each of which may comprise one or more program modules such as program modules 42 described with respect to FIG. 1. In the example of FIG. 4, the server 404 includes a data collection module 410, a data store module 411, a modified event parser module 412, a user interface module 413, an adaptive model module 414, an embedding module 415, a classification module 416 and a cluster module 417, each of which may comprise program module(s) 42 of FIG. 1, for example.

In implementations, the data collection module 410 is configured to collect IT operations (Ops) data (e.g., IT log data and/or IT ticket data, such as alert tickets and error tickets) from one or more client devices 406. In embodiments, the data collection module 410 collects IT Ops data generated by an IT Operations module 420 of a client device 406, via a communication module 421 of the client device 406. Alternatively, the data collection module 410 may obtain IT Ops data from a local source (e.g., data storage module 411). In implementations, the data collection module 410 is configured to store data obtained from remote sources in local or remote data storage (e.g., data storage module 411).

In embodiments, the event parser module 412 is configured to generate event groupings of similar data records based on similarity of text and keywords determined by the adaptive model module 414. In implementations, the event parser module 412 comprises a modified log parser adapted to handle specific words (keywords) when creating event templates.

In implementations, the user interface module 413 is configured to provide a user with a user interface to interact with IT Ops software of the server 404. In embodiments a user can select an event grouping task in an AIOps field of the user interface to initiate an event grouping event or task at a low level of granularity or a high level of granularity, based on user input. In implementations, the user interface module 413 is configured to present event grouping outputs to a user, obtain feedback from the user regarding the outputs, and provide feedback data to the server 404 for use in customizing the event grouping task for the user.

In aspects of the invention, the adaptive model module 414 is configured to perform steps of an event grouping task at a low level of granularity. In implementations, the adaptive model module 414 is configured to extract parameters from IT Ops data, extract features from the IT Ops data, analyze the extracted data to determined keywords utilizing a classification model, updating a classification model based on keywords determined over time, and update the event parsing module 413 based on the determined keywords.

In embodiments, the embedding module 415 is configured to transform high dimensional IT Ops data to low-dimensional vectors for use by the classification module 416 and the cluster module 417 to generate event groupings of related data records (i.e., event groupings at a high level of granularity). In implementations, the embedding module 415 separately embeds data from different sources (e.g., topology nodes and time series data, and text information), then merges the vectors into a single multi-dimensional vector using a statistical method (e.g., sum, mean, weighted sum).

In embodiments, the classification module 416 utilizes a classification model to determine whether data records (e.g., log or ticket records) are related based on vector data inputs, and customize the classification model with classification labels based on feedback from users. In implementations, the cluster module 417 is configured to utilize clustering methods on the vector data inputs to determined whether data records are related, and modifies the cluster merging process based on feedback from users.

The server 404 and the one or more client devices 406 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5A:
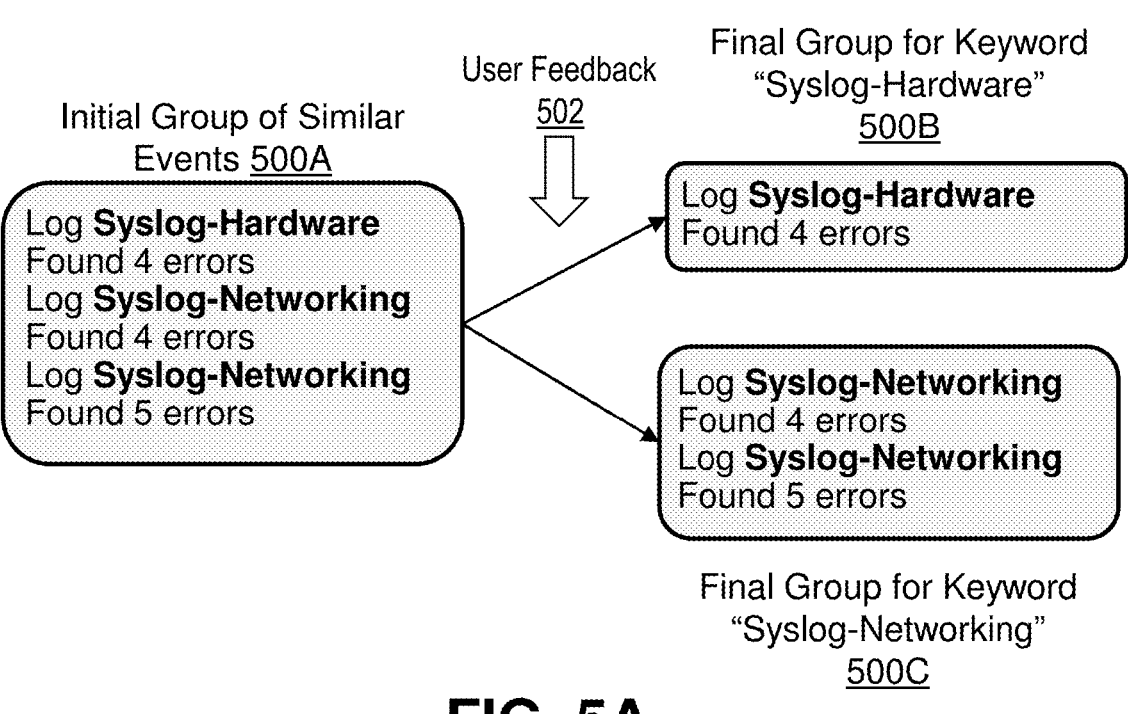
FIG. 5A is an example of event grouping at a low level of granularity customized through user feedback, in accordance with embodiments of the invention.

In embodiments of the invention, the server 404 is configured to group individual data records (IT Ops records) at multiple levels of granularity to meet different requirements of customers (e.g., users of client devices 406). In implementations, the server 404 employs adaptive learning, which involves feedback from customers to address the unique needs of users to guide the generation of different event groups. In general, the event grouping approach according to embodiments of the invention enables the generation of record groups with a lower level of granularity, and the generation of record groups with higher level of granularity FIG. 5A is an example of event grouping at a low level of granularity customized through user feedback, in accordance with embodiments of the invention. Steps illustrated in FIG. 5A may be carried out in the environment of FIG. 4 and are described with reference to elements depicted in FIG. 4.

In implementations of the invention, the server 404 obtains IT Ops data and determines groups of similar data records (a lower level of granularity) based on a specialized text parser (e.g., event parser module 412). Existing text parsers group data records according to similarity of text. However, in the IT Ops field, there is a need to group data records using keywords. Embodiments of the invention use an adaptive model (e.g., adaptive model module 414) to extract these keywords from IT Ops data and re-input the keywords to modify the specialized text parser (e.g., event parser module 412).

In the example of FIG. 5A, the server 404 initially determines a group of similar events 500A, comprising log errors of IT Ops data. Based on user feedback 502 obtained via the user interface module 413, the server 404 customizes parser rules based on the determined keywords "Syslog-hardware" and "Syslog-Networking". With this modification, the specialized event parser (e.g., vent parser module 412) of the present invention generates two final event groups including a final group 500B comprising events utilizing the keyword "Syslog-Hardware" and a final group 500C comprising events utilizing the keyword "Syslog-Networking."

Figure 5B:
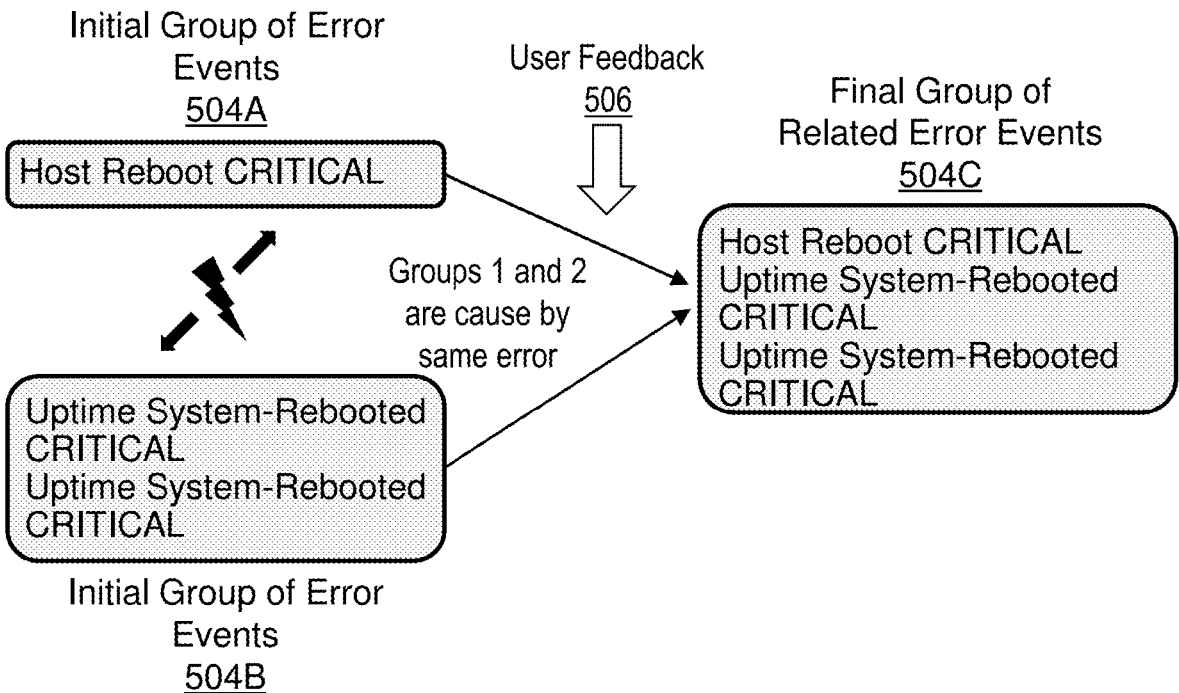
FIG. 5B is an example of event grouping at a high level of granularity customized through user feedback, in accordance with embodiments of the invention.

FIG. 5B is an example of event grouping at a high level of granularity customized through user feedback, in accordance with embodiments of the invention. Steps illustrated in FIG. 5B may be carried out in the environment of FIG. 4 and are described with reference to elements depicted in FIG. 4.

In implementations of the invention, the server 404 obtains IT Ops data and determines groups of related data records (a higher level of granularity) that may not be semantically similar. In implementations, the server 404 applies cluster and/or classification algorithms to determine potential relationships between sets of data records.

In the example of FIG. 5B, the server 404 determines two initial groups of error events; an initial group 504A for the data record "Host Reboot CRITICAL" and an initial group 504B for two instances of the data record "Uptime System-Rebooted CRITICAL". Based on user feedback 506 obtained via the user interface module 413, the server 404 customizes classification data or clustering rules. With this customization/modification, the server 404 generates a final group of related error events 504C comprising all the data records of the initial groups 504A and 504B, based on the data records being caused by the same error.

Figure 6:
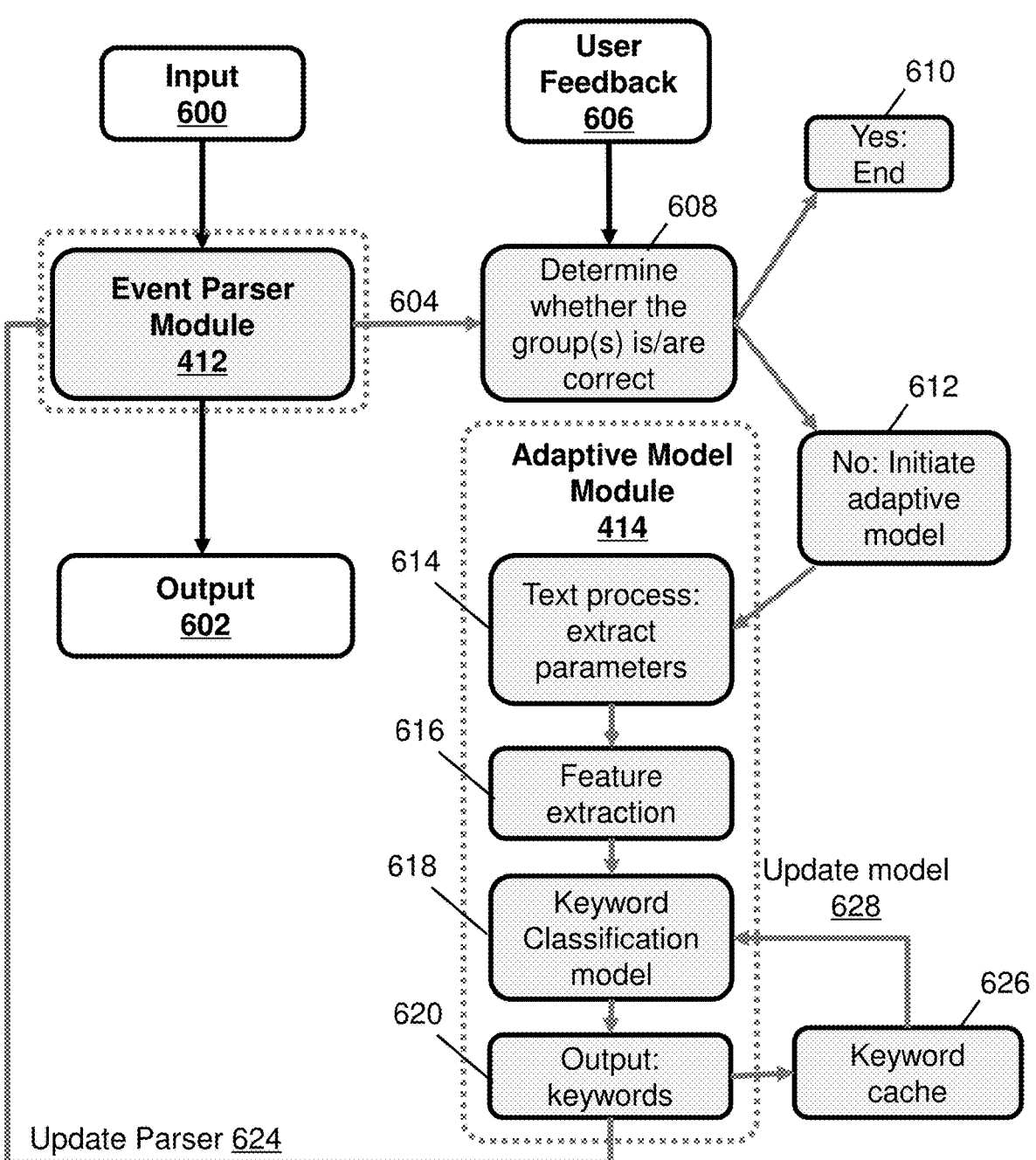
FIG. 6 is a diagram representing event grouping at a low level of granularity in accordance with embodiments of the invention.

FIG. 6 is a diagram representing event grouping at a low level of granularity in accordance with embodiments of the invention. Steps illustrated in FIG. 6 may be carried out in the environment of FIG. 4 and are described with reference to elements depicted in FIG. 4.

In the example of FIG. 6, IT Ops data such as log data and/or ticket data is utilized as an input 600 for a specialized event parser module 412, which generates an output 602 of one or more groups of data records (e.g., logs or tickets) based on text information of the IT Ops data. In embodiments, the event parser module 412 comprises a log parser modified to handle additional keywords, such that the event parser module 412 can cover specific words when it creates event templates.

In implementations, the event parser module 412 provides the one or more groups of data records to a user (e.g., via the user interface module 413) as indicated at 604, and receives user feedback 606. At 608, the server 404 determines whether the one or more groups require modification (e.g., are correct). If the server 404 determines that the output 602 does not need modification (e.g., is correct), the process ends at 610. If, however, the server 404 determines that the output 602 does require modification (e.g., is not correct) based on the user feedback 606, then the server 404 initiates the adaptive model module 414 at 612.

In implementations, the adaptive model module 414 extracts parameters from text information of the IT Ops data at 614, extracts features of the IT Ops data at 616, and analyzes the extracted parameter and features data utilizing a trained keyword classification model (machine learning model configured for adaptive learning) at 618 to determine keywords as an output at 620. More specifically, the server 404 utilizes the keyword classification model to determine a probability that a word is a keyword, and when the word has a probability above a predetermined threshold a predetermined number of times, the server 404 identifies the word as a keyword for use in parsing rules for the event parsing module 412. Accordingly, the server 404 updates parser rules of the event parser module 412 at 624 based on the keywords. In this case, the determined keywords will be considered as part of the template of future event groups. In implementations, when a cache of keywords 626 determined over time by the adaptive model module 414 reaches a threshold amount, the server 404 updates/trains the keyword classification model 618 based on the keywords at 628.

In implementations, the keyword classification model 618 is initially trained with keyword and non-keywords from historic data of a customer environment. In implementations, when user feedback 606 indicates that the one or more groups of data records provided to the user are not similar, the server 404 splits and transforms the text description of the data records (event description) into tokens using natural language process (NLP) data processing methods. Features are then extracted from the tokens. Using the technology of feature engineering, the server 404 creates character level features such as numbers of specific characters in a token for each single token. These features are used in the keyword classification model 618 to determine whether a word in a data record description is a potential keyword. In embodiments, every time customers provide the server 404 with feedback, the keyword classification model 618 processes the data records at issue to predict which word in the data records description is a potential keyword, and saves the potential keyword in a database with an assigned weight. After multiple feedback processes, the weight for a certain potential keyword will reach a threshold value, at which time the server 404 considers the potential keyword to be an actual keyword. The server 404 then adds the actual keyword to training data used for further training of the keyword classification model 618.

Figure 7:
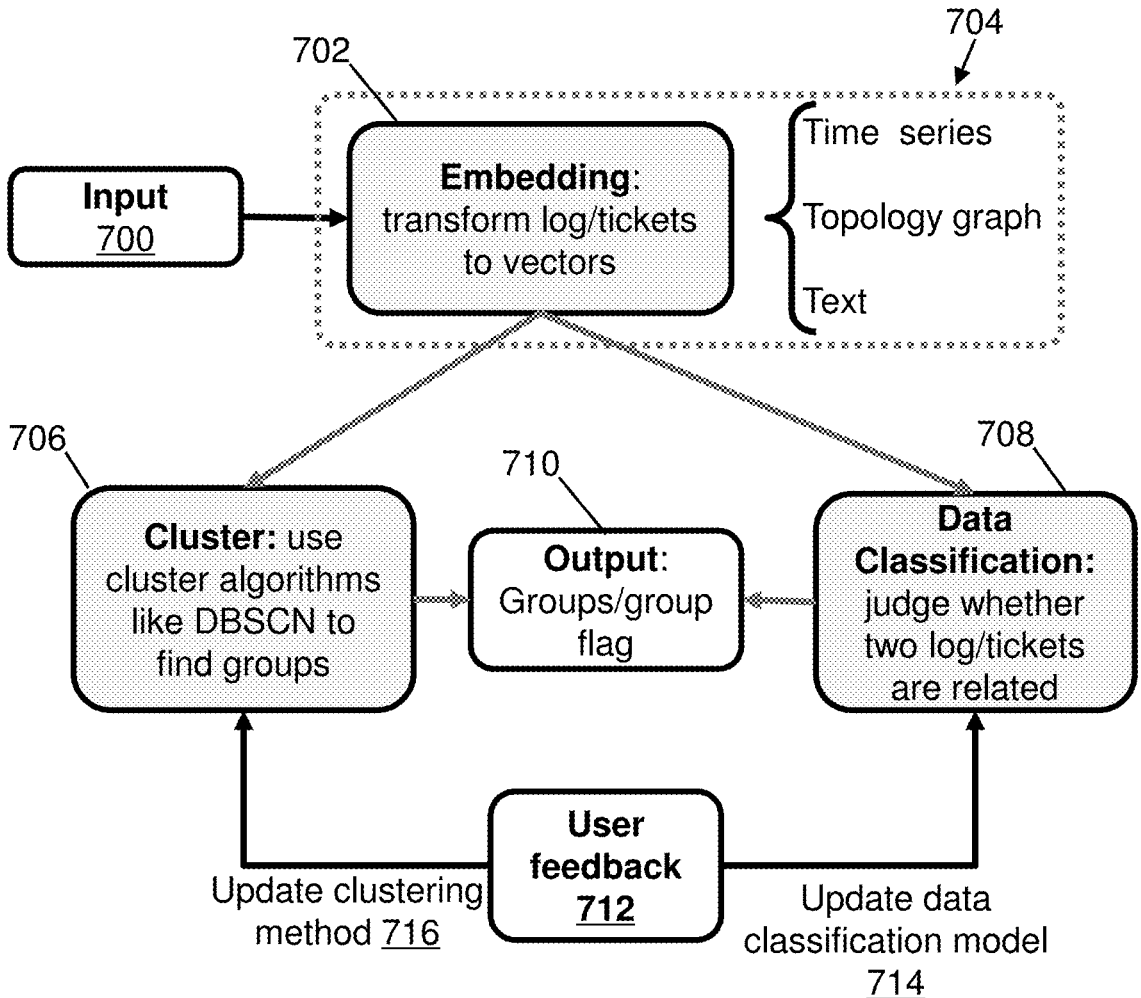
FIG. 7 is a diagram representing event grouping at a high level of granularity in accordance with embodiments of the invention.

FIG. 7 is a diagram representing event grouping at a high level of granularity in accordance with embodiments of the invention. Steps illustrated in FIG. 7 may be carried out in the environment of FIG. 4 and are described with reference to elements depicted in FIG. 4.

In general, embedding is an effective tool that transforms high-dimensional data like graphs to low-dimensional vectors, without unacceptable loss of information. Embedding is utilized in AI fields including computer vision and natural language processing. In the example of FIG. 7, the server 404 receives IT Ops data (e.g., log and ticket data), and uses the data as an input 700 for an embedding process 702. In implementations, the server 404 separates embedded data from different IT Ops sources, and then merges the embedded data to generate a single vector. In the example of FIG. 7, the server 404 embeds multi-dimensional data 704 (e.g., time series data, topology graph data and text data) to generated vector data. In embodiments, the server 404 applies graph and time series embedding to collect information for data records produced in the neighboring or same nodes, or in the same time period. In implementations, during graph embedding, the server 404 treats all nodes and edges equally, since the server is only concerned with adjacent nodes. Similarly, during time series embedding, the server 404 splits raw time series data into smaller pieces of time series data using a sliding time window, and embeds the data with one-hot embedding.

In aspects of the invention, the server 404 utilizes text embedding methods (e.g., word2vec) to embed text information of IT Ops input data 700, as indicated at 702. The server utilizes a clustering method 706 or a data classification model (machine learning model configured for adaptive learning) at 708 to determine related event groups. In embodiments, a user can select to use either the clustering method 706 or the data classification model according to their requirements (e.g., via UI selectable options). In implementations, a density-based spatial clustering of applications with noise (DBSCAN) algorithm may be utilized by the server 404 at 706. In embodiments, when the server 404 utilizes a data classification model (e.g., classification module 416) at 708 to determine related event groups, the server 404 merges data embeddings for the topology nodes and time series, and the data embeddings for text, using one of a variety of statistical methods, such as sum, mean and weighted sum. Alternative, when the server 404 utilizes a cluster method (e.g., cluster module 417) at 706 to determine related event groups, the server 404 merges data embeddings for the topology nodes and time series, and the data embeddings for text, using weighted sum methods. An output 710 from the cluster method 706 or the classification method 708 may be in the form of groups of event data (via clustering) and groups of flagged data (via classification).

In implementations, the server 404 provides the output 710 to a user (e.g., via the user interface module 413 and a display of the client device 406), and the user optionally provides user feedback 712 to the server 404 (e.g., via a client device 406 through the user interface module 413). In embodiments, the server 404 uses the user feedback 712 as a label in the classification method to update a data classification model, as indicated at 714. In implementations, the server 404 uses the user feedback 712 to update the clustering method, by updating the merge process of the clustering method (i.e., how clusters are merged to get final results), as indicated at 716. In embodiments, the server 404 assigns events to different small clusters using a clustering method. Each cluster contains similar events and has a mathematical center point that can be regarded as the representative of the entire cluster. In implementations, the server 404 provides a customer/user with representative events from the homogeneous clusters and feedback from the user indicates events in correct groupings. From the user feedback, the server 404 can determine the distribution information of a center point of related clusters. In embodiments, the server 404 saves the distribution information, which is utilized in generating future clusters. In other words, when a similar distribution appears, the server 404 will automatically merge the small clusters and generate better results.

Figure 8:
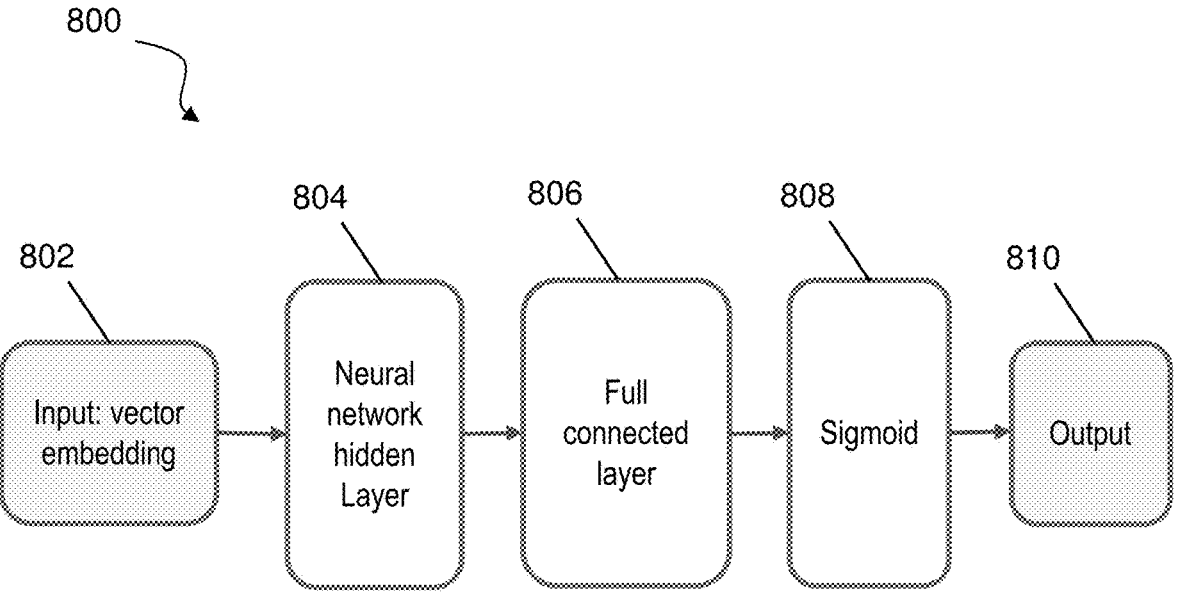
FIG. 8 is a flowchart depicting a classification model architecture in accordance with embodiments of the invention.

FIG. 8 is a flowchart depicting architecture of a data classification model in accordance with embodiments of the invention. FIG. 8 represents a data classification model 800 utilized to perform data classification in accordance with step 708 of FIG. 7. The data classification model 800 may be in the form of an artificial neural network model. The data classification model 800 includes an input in the form of embedded data 802, a neural network hidden layer 804, a full connected layer 806, a sigmoid function 808 and an output 810. In general, an artificial neural network is composed of a series of layers, and each layer consist of a set of artificial neurons or nodes. Each layer performs a different translation (e.g., the linear/nonlinear conversion in the hidden layers 804 and the full connection in the full connected layer 806) of their input data. In such systems, the inputs of the current layers are the outputs of the previous layers. In the data classification model 800 of FIG. 8, the final output of the data classification model is a True/False label for the input data. In implementations of the invention, the sigmoid function 808 is a sigmoid cross-entropy loss function.

Figure 9A:
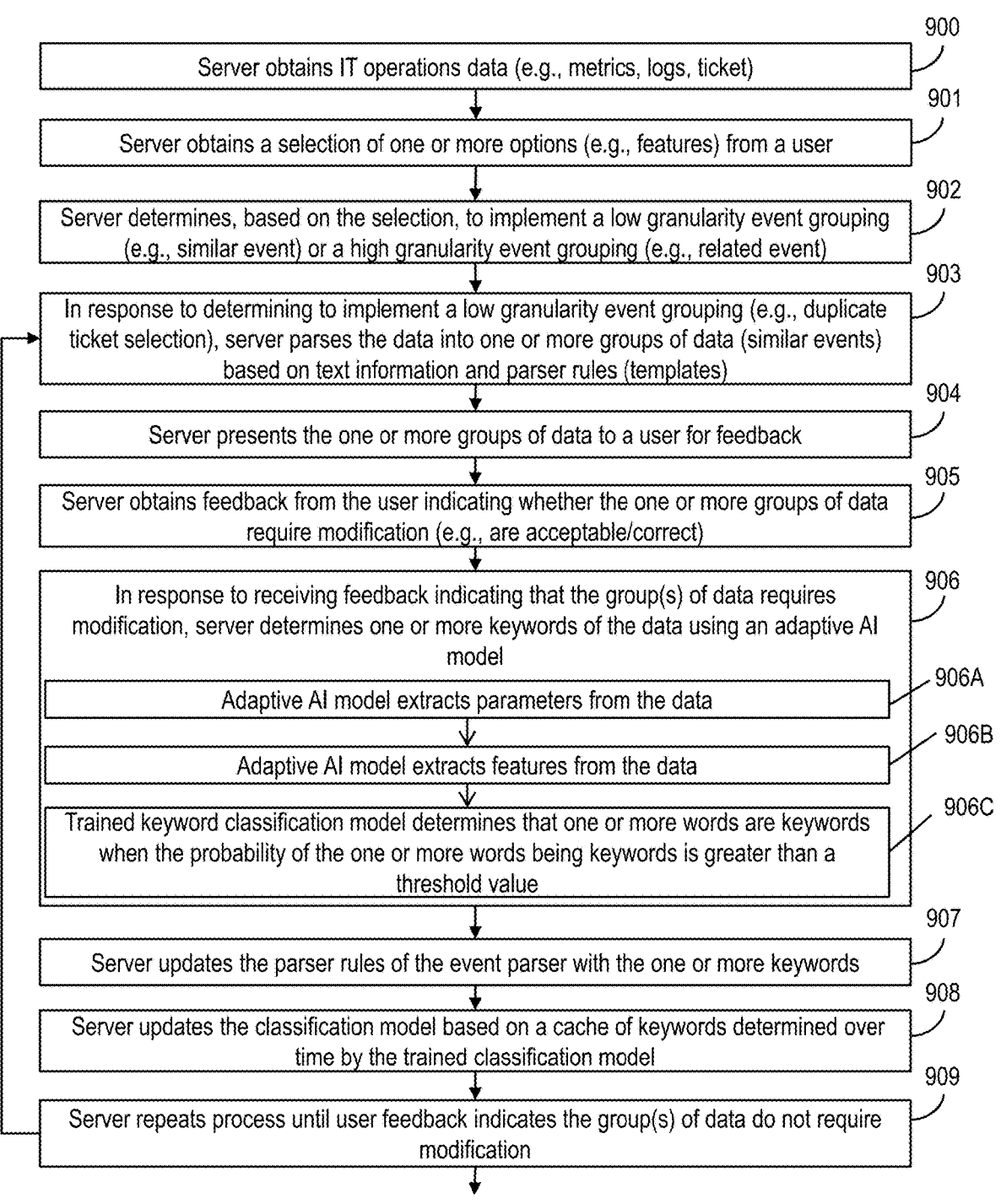

FIGS. 9A and 9B show a flowchart of an exemplary method in accordance with aspects of the present invention. Steps of the method may be carried out in the environment of FIG. 4 and are described with reference to elements depicted in FIG. 4.

With initial reference to FIG. 9A, at step 900, the server 404 obtains IT Ops data from an internal source (e.g., data storage module 411) or from an external source (e.g., client device 406). In implementations, IT Ops data comprises log and/or ticket data from an IT management system. The IT Ops data may be in the form of error alerts and system failures, for example. In embodiments, the data collection module 410 of the server 404 implements step 900.

At step 901, the server 404 obtains a selection of an option (e.g., IT management options) from a user. The user selection may be obtained through a user interface provided to the user via the user interface module 413, and accessed by the user client device 406. In implementations, the server 404 receives a selection of an IT management feature, such as a request for similar tickets or logs, or a request for related tickets or logs. In embodiments, the selection of the user may be a selection to implement either a low granularity event grouping, or a high granularity event grouping based on the user's requirements. In embodiments, the data collection module 410 of the server 404 implements step 901.

At step 902, the server 404 determines to implement either a low granularity event grouping, or a high granularity event grouping based on a type of the option selected by the user and predetermined rules. For example, if the user-selected option requires the grouping of similar log or ticketing records (e.g., an option to obtain duplicate tickets), the server 404 may determine to implement a low granularity event grouping. Alternatively, if the user-selected option requires the grouping of related log or ticketing records, the server 404 may determine to implement a high granularity event grouping. In embodiments, the data collection module 410 of the server 404 implements step 902.

At step 903, in response to determining to implement a low granularity event grouping at step 902, the server 404 parses the IT Ops data into one or more groups of data (e.g., similar events) based on text information of the IT Ops data and parser rules. In embodiments, the server 404 groups data records according to a text template. In implementations, the text template includes keywords determined by the adaptive model module 414 of the server 404 in accordance with step 906 discussed below. One example of a group of similar events is depicted at 500A in FIG. 5A. In embodiments, the event parser module 412 of the server 404 implements step 903.

At step 904, the server 404 presents the one or more groups of data (e.g., a group of similar IT ticket records) determined at step 903 to a user. In embodiments, the user interface module 413 of the server 404 implements step 904.

At step 905, the server 404 optionally obtains feedback from the user indicating whether the groups of data presented at 904 requires modification (e.g., are acceptable/correct). The user feedback may be in the form of a user-selected button or text input in a user interface (provided by the user interface module 413, for example). In embodiments, the user interface module 413 of the server 404 implements step 905.

At step 906, in response to receiving feedback indicating that the one or more groups of data require modification, the server 404 determines one or more keywords of the IT Ops data using an adaptive artificial intelligence AI model. In embodiments, the adaptive model module 414 of the server 404 implements step 906. Substeps 906A-906C performed by the server 404 in accordance with step 906 are discussed below.

At substep 906A, the server 404 extracts parameters from the IT Ops data. In one example, an IT record indicates "Memory Critical 95%", and the parameter extracted is 95%. In embodiments, the adaptive model module 414 of the server 404 implements substep 906A.

At substep 906B, the server 404 extracts features from the IT Ops data. In one example, a feature extracted is a number of characters of a word. In embodiments, the adaptive model module 414 of the server 404 implements substep 906B.

At substep 906C, the server 404 determines that one or more words in the IT Ops data are keywords when a probability of the one or more words being a keyword is greater than a predetermined threshold value more than a threshold number of times. In embodiments, the adaptive model module 414 of the server 404 utilizes a trained keyword classification model (see e.g., step 618 of FIG. 6) to implement substep 906C, with the parameters and features as inputs. In embodiments, the adaptive model module 414 constructs a classification and regression tree (CART) at step 906C. The following equations Eq.1 and Eq.2 are utilized to construct the CART.

$$\min_{j,s}\left[\min_{c_1}\sum_{x_i\in R_1(j,s)}(y_i-c_1)^2+\min_{c_2}\sum_{x_i\in R_2(j,s)}(y_i-c_2)^2\right] \quad \text{Eq. 1}$$

$$f(x)=\sum_{m=1}^{M}c_mI\big(x\in\mathcal{R}_m\big) \quad \text{Eq. 2}$$

In implementations, the server 404 uses Eq.1 to divide a space where a dataset is located and determine an output value of the keyword classification model in each spatial part. Specifically, in the space where the training dataset is located, each region is recursively divided into two regions to determine the output value of the keyword classification model in each subregion. The dataset is represented by $(x_i, y_i)$, i=1,2, . . . , n. In other words, the data volume is n. The server 404 selects the $j^{th}$ component $x^{(j)}$ and its value s as the segmentation variable and segmentation point, and defines two regions: $R_1(j, s)=\{x|x^{(j)}\leq s\}$ and $R_2(j,s)=\{x|x^{(j)}>s\}$, wherein $x^{(j)}$ represents the $j^{th}$ component of x and s is the value of $x^{(j)}$). $R_1(j,s)$ and $R_2(j,s)$ is a division of the data space. Then we traverse j and s, looking for j and s that minimizes Eq.1. The variable $c_1$ is the predicted value of the model in the region $R_1$, and $c_2$ is the predicted value of the model in the region $R_2$.

In embodiments, the Eq. 2 is the formula of Classification and Regression Trees (CART) that adopts the output of Eq.1. $\mathcal{R}_m$ is like the $\mathcal{R}_1$ and $\mathcal{R}_2$ in Eq.1, so $\mathcal{R}_m$ is one part of a data space and we divide our data space into M parts (m=1,2,3, . . . , M). The variable $c_m$ is the predicted value of the model CART for the region $\mathcal{R}_m$. $I(x\in\mathcal{R}_m)$ is an indicator function. If $x\in\mathcal{R}_m$, then $I(x\in\mathcal{R}_m)=1$, otherwise $I(x\in\mathcal{R}_m)=0$.

At step 907, the server 404 updates the parser rules of the event parser (e.g., event parser module 412) with the one or more keywords of the IT Ops data. In embodiments, the adaptive model module 414 of the server 404 implements step 907. See, for example, the updating of the parser at 624 in FIG. 6. It should be understood that the server 404 may be configured to continuously update the parser rules of the event parser based on user feedback, thereby enabling the event parser to automatically produce event groups with a courser or finer granularity (e.g., broader event groupings or more specific event groupings) over time.

At step 908, the server 404 updates the keyword classification model of the adaptive AI model based on keywords determined over time by the adaptive AI model (e.g., adaptive model module 414). In implementations, when the number of keywords determined by the adaptive AI model over time (e.g., keywords in cache 626 of FIG. 6) reaches a predetermined threshold number, the server 404 initiates the updating/training of the keyword classification model (see updating of the model at 626 in FIG. 6) based on the accumulated keywords. In embodiments, the adaptive model module 414 of the server 404 implements step 908.

At step 909, the server 404 repeats steps 903-908 until there is no feedback from the user, or the user feedback indicates that the one or more groups of data (e.g., event groups) do not require modification. In this way, embodiments of the invention enable iterative customization of the event parser (e.g., event parser module 412) and adaptive model (e.g., adaptive model module 414) to provide users with more customized automated outputs (e.g., more customized event groupings). See, for example, the final groups 500B and 500C in FIG. 5A grouping data records based on determined keywords, for example.

Turning to FIG. 9B, in response to the server 404 determining to implement a high granularity event grouping (e.g., groups of tickets caused by a same error), at step 910 the server 404 determines groups of related events using a data classification model and/or clustering method. Substeps 910A-910G performed by the server 404 in accordance with step 910 are discussed below.

At substep 910A, the server 404 embeds multi-dimensional IT Ops data to transform the data to vector data, and merges the vector data from the multiple dimensions. In implementations, the multi-dimensional data comprises time series data, topology graph data and text data. See the multi-dimensional data 704 of FIG. 7, for example. In embodiments, the embedding module 415 of the server 404 implements substep 910A. Depending on user input, the server 404 performs high granularity event grouping using a clustering method at substep 910B, or using a data classification model at substep 910C.

At substep 910B, the server 404 determines a set of related events of the IT Ops data using a cluster method with the multi-dimensional vector data as the input. In embodiments, the server utilizes the DBSCAN cluster algorithm to determine clusters of data from which to derive a set of related events (e.g., related records). In embodiments, the cluster module 417 of the server 404 implements substep 910B.

At substep 910C, as an alternative of substep 910B, the server 404 determines a set of related events of the IT Ops data using a trained data classification model (e.g., binary classification model) with the multi-dimensional vector data as the input. In aspects of the invention, an output of the data classification model comprises a true positive or a true negative. In one example, a true positive is determined for data records (e.g., log or ticket data) generated within one time window on one node. In another example, a true negative is determined for data records (e.g., log or ticket data) generated on distant nodes in different time periods. In embodiments, the classification module 416 of the server 404 implements substep 910C.

At substep 910D, the server 404 presents the set of related events determined at substeps 910B or 910C to a user as outputs of the server 404. In embodiments, the user interface module 413 of the server 404 implements substep 910D.

At substep 910E, the server 404 obtains user feedback, if provided, and uses the feedback in the cluster merging process of substep 910B. See the cluster updating at 716 of FIG. 7, for example. In embodiments, the cluster module 417 of the server 404 implements substep 910E.

At substep 910F, the server 404 utilizes user feedback, if any, as labels to update classification labels of the trained data classification model. See the updating of the data classification model at 714 in FIG. 7, for example. In embodiments, the classification module 416 of the server 404 implements substep 910F. In implementations, substep 910F uses the cross-entropy loss function (in the case of multi-classification) of Eq.4.

$$L = \frac{1}{N}L_i = -\frac{1}{N}\sum_i \sum_{c=1}^{M} y_{ic}\log(p_{ic}) \qquad \text{Eq. 4}$$

The cross-entropy loss function set forth above can measure the performance of the data classification model during training, where the lower the loss the better the model is. The variable $y_i$ is the label of data, wherein $y_i=(y_{i1},y_{i2}, \ldots ,y_{iM})$ and $y_{ic}$ is the $c^{th}$ component of $y_i$. The variable $p_i$ stands for predicted probability based on our model, wherein $p_i=(p_{i1}, p_{i2}, \ldots , p_{iM})$ and $p_{ic}$ is the $c^{th}$ component of $$p_i \cdot L_i = -\sum_{c=1}^{M} y_{ic}\log(p_{ic})$$

and M represents the number of categories. Accordingly, embodiments of the invention optimize and update parameters of the data classification model through minimizing the loss function.

At substep 910G, the server 404 repeats substeps of FIG. 9B until there is no more user feedback, or the user feedback indicates the set of related events (i.e., related event groupings) do not require modification. In this way, embodiments of the invention enable iterative customization of the data classification model (e.g., classification module 416) and/or the cluster method (e.g., cluster module 417) to provide users with more customized automated outputs (e.g., more customized event groupings). See the final group of related error events 504C in FIG. 5B, for example, which combines groups of records caused by the same error based on user feedback 506.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, by a computing device, to group Information Technology (IT) operations data at a first level of granularity for similar events or at a second level of granularity for related events based on user input of a data grouping event, received through a user interface communicatively connected to the computing device;

parsing, by an event parser of the computing device, the IT operations data into one or more groups of similar events based on text information and parser rules according to a text template of one or more keywords in response to determining to group the IT operations data at the first level of granularity, wherein the event parser is a log parser modified to handle specific keywords when creating event templates;

obtaining, by the computing device, user feedback repeatedly through a user-selected button on the user interface indicating that the one or more groups of similar events require modification;

determining, by the computing device, the one or more keywords of the IT operations data using an artificial intelligence model in response to the user feedback; and updating, by the computing device, the parser rules for the event parser based on the one or more keywords, thereby generating updated parser rules such that the event parser can automatically produce the one or more groups of similar events over time.

2. The method of claim 1, further comprising:

parsing, by the event parser of the computing device, the IT operations data into one or more new groups of similar events based on the text information and the updated parser rules; and providing, by the event parser, the one or more new groups of similar events to the user in response to the user input.

3. The method of claim 2, further comprising:

receiving, by the computing device, new feedback from the user that the one or more new groups of similar events do not require modification; and ending, by the computing device, the data grouping event.

4. The method of claim 1, wherein the determining the one or more keywords of the IT operations data comprises:

extracting, by the computing device, parameters from the IT operations data;

extracting, by the computing device, features from the IT operations data; and determining, by the computing device, based on an output of a trained classification model with the parameters and the features as inputs, that one or more words are the one or more keywords based on the one or more words have a probability of being keywords greater than a threshold value.

5. The method of claim 4, further comprising updating, by the computing device, the trained classification model based on the keywords.

6. The method of claim 1, further comprising:

determining, by the computing device, whether to group IT operations data at a first level of granularity for similar events or a second level of granularity for related events based on additional user input of a second data grouping event;

transforming, by the computing device, the IT operations data to multi-dimensional vector data in response to determining to group the IT operations data at the second level of granularity based on the additional user input;

determining, by the computing device, a group of related events using a trained data classification model with the multi-dimensional vector data as input; and updating, by the computing device, classification labels of the trained classification model based on user feedback regarding the group of related events.

7. The method of claim 1, further comprising:

determining, by the computing device, whether to group the IT operations data at the first level of granularity for similar events or the second level of granularity for related events based on additional user input of a second data grouping event;

transforming, by the computing device, the IT operations data to multi-dimensional vector data in response to determining to group the IT operations data at the second level of granularity based on the additional user input; and obtaining, by the computing device, a group of related events using a density-based spatial clustering algorithm with the multi-dimensional vector data as input.

8. The method of claim 1, wherein the computing device includes software provided as a service in a cloud environment.

9. A computer program product comprising one or more computer readable storage media having program instructions collectively stored on the one or more computer readable storage media, the program instructions executable to:

determine whether to group Information Technology (IT) operations data at a first granularity for similar events or a second granularity for related events based on user input of a data grouping event;

in response to determining to group the IT operations data at the first level of granularity based on the user input, parse the IT operations data into a first set of event groupings using an event parser based on text information and parser rules according to a text template of one or more keywords, wherein the event parser is a log parser modified to handle specific keywords when creating event templates;

in response to determining to group the IT operations data at the second level of granularity based on the user input, transform the IT operations data to multi-dimensional vector data, the multi-dimensional vector data generated by separately embedding data from different sources and merging them using a statistical method; and in response to transforming the IT operations data to multi-dimensional vector data, determine a second set of event groupings density-based spatial clustering algorithm with the multi-dimensional vector data as input.

10. The computer program product of claim 9, wherein the program instructions are further executable to:

obtain user feedback indicating the first set of event groupings require modification;

automatically determine one or more keywords of the IT operations data using an adaptive artificial intelligence model in response to the user feedback; and automatically update the parser rules based on the one or more keywords, thereby obtaining updated parser rules.

11. The computer program product of claim 10, wherein the determining the one or more keywords of the IT operations data comprises:

extracting parameters from the IT operations data;

extracting features from the IT operations data; and determining based on an output of a trained classification model with the parameters and the features as inputs, that one or more words are the one or more keywords based on the more or more words have a probability of being keywords greater than a threshold value.

12. The computer program product of claim 10, wherein the program instructions are further executable to update the trained classification model based on the determining the one or more keywords.

13. The computer program product of claim 10, wherein the program instructions are further executable to determine a third set of event groupings using a trained data classification model with the multi-dimensional vector data as input.

14. The computer program product of claim 13, wherein the program instructions are further executable to update classification labels of the trained classification model based on user feedback regarding the third set of event groupings.

15. A system comprising:

a processor, a computer readable memory, one or more computer readable storage media, and program instructions collectively stored on the one or more computer readable storage media, the program instructions executable to:

determine whether to group Information Technology (IT) operations data at a first level of granularity for similar events or a second level of granularity for related events based on user input of a data grouping event;

in response to determining to group the IT operations data at the first level of granularity based on the user input, parse the IT operations data into a first set of event groupings using an event parser based on text information and parser rules according to a text template of one or more keywords, wherein the event parser is a log parser modified to handle specific keywords when creating event templates;

in response to determining to group the IT operations data at the second level of granularity based on the user input, transform the IT operations data to multi-dimensional vector data, the multi-dimensional vector data generated by separately embedding data from different sources and merging them using a statistical method; and in response to transforming the IT operations data to multi-dimensional vector data, determine a second set of event groupings using a density-based spatial clustering algorithm with the multi-dimensional vector data as input.

16. The system of claim 15, wherein the program instructions are further executable to:

obtain user feedback indicating the first set of event groupings require modification;

automatically determine one or more keywords of the IT operations data using an adaptive artificial intelligence model in response to the user feedback; and automatically update the parser rules based on the one or more keywords, thereby obtaining updated parser rules.

17. The system of claim 15, wherein the determining the one or more keywords of the IT operations data comprises:

extracting parameters from the IT operations data;

extracting features from the IT operations data; and determining based on an output of a trained classification model with the parameters and the features as inputs, that one or more words are the one or more keywords based on the more or more words have a probability of being keywords greater than a threshold value.

18. The system of claim 17, wherein the program instructions are further executable to update the trained classification model based on the determining the one or more keywords.

19. The system of claim 15, wherein the program instructions are further executable to determine a third set of event groupings using the density-based spatial clustering algorithm with the multi-dimensional vector data as input.

20. The system of claim 19, wherein the program instructions are further executable to update classification labels of the trained classification model based on user feedback regarding the third set of event groupings.

\* \* \* \* \*